(12) United States Patent
Oohira et al.

(10) Patent No.: US 9,960,000 B2
(45) Date of Patent: May 1, 2018

(54) PROTECTIVE DEVICE

(75) Inventors: Masayuki Oohira, Tokyo (JP);
Katsuaki Suzuki, Ryugasaki (JP);
Arata Tanaka, Ryugasaki (JP)

(73) Assignee: Littelfuse Japan G.K., Tokyo (JP)

( * ) Notice: Subject to any disclaimer, the term of this patent is extended or adjusted under 35 U.S.C. 154(b) by 955 days.

(21) Appl. No.: 13/994,501

(22) PCT Filed: Dec. 15, 2011

(86) PCT No.: PCT/JP2011/079018
§ 371 (c)(1),
(2), (4) Date: Oct. 2, 2014

(87) PCT Pub. No.: WO2012/081659
PCT Pub. Date: Jun. 21, 2012

(65) Prior Publication Data
US 2015/0022311 A1 Jan. 22, 2015

(30) Foreign Application Priority Data
Dec. 16, 2010 (JP) .................. 2010-280589

(51) Int. Cl.
*H01H 37/34* (2006.01)
*H01H 37/54* (2006.01)
(Continued)

(52) U.S. Cl.
CPC ............ *H01H 37/34* (2013.01); *H01H 37/54* (2013.01); *H02H 5/042* (2013.01); *H02H 5/047* (2013.01);
(Continued)

(58) Field of Classification Search
CPC ........ H01H 37/34; H01H 37/54; H01H 37/52; H02J 7/0031; H02H 5/042; H02H 5/047; H01C 7/02
(Continued)

(56) References Cited

U.S. PATENT DOCUMENTS 3,840,834 A * 10/1974 Obenhaus ........ G01R 19/16571
337/107
5,864,458 A * 1/1999 Duffy .................. C11D 11/0082
361/10
(Continued)

FOREIGN PATENT DOCUMENTS

CA 2721512 A1 * 10/2009 ............. H01C 13/02
CN 1287373 A 3/2001
(Continued)

OTHER PUBLICATIONS

International Search Report for International Application No. PCT/JP2011/079018, dated Mar. 13, 2012.
(Continued)

*Primary Examiner* — Jerry Wu
*Assistant Examiner* — Stephen Sul

(57) ABSTRACT

The present invention provides a protection device which provides a greater degree of freedom in a disposition of the bimetal switch as well as be able to more accurately control an actuation of the bimetal member of the bimetal switch. The protection device characterized in that the device comprises a bimetal switch wherein a first PTC member and a bimetal member are connected electrically in parallel with each other; and a second PTC member; and the bimetal member is disposed to be actuated by tripping of the second PTC member.

5 Claims, 6 Drawing Sheets

(51) Int. Cl.
  *H02H 5/04* (2006.01)
  *H02J 7/00* (2006.01)
  *H01C 7/02* (2006.01)
  *H01H 37/52* (2006.01)
(52) U.S. Cl.
  CPC .............. *H02J 7/0031* (2013.01); *H01C 7/02* (2013.01); *H01H 37/52* (2013.01)
(58) Field of Classification Search
  USPC ........................................................ 337/299
  See application file for complete search history.

(56) References Cited

U.S. PATENT DOCUMENTS

| | | | | |
|---|---|---|---|---|
| 6,346,796 | B1* | 2/2002 | Takeda | H01H 37/5436 320/154 |
| 6,346,976 | B1 | 2/2002 | Takeda | |
| 2005/0128043 | A1* | 6/2005 | Ying | H01H 9/32 337/36 |
| 2005/0174211 | A1* | 8/2005 | Takeda | H01H 1/504 337/377 |
| 2008/0116851 | A1 | 5/2008 | Mori | |
| 2010/0208406 | A1 | 8/2010 | Suzuki | |
| 2011/0043321 | A1* | 2/2011 | Takeda | H01H 37/14 337/362 |
| 2011/0140827 | A1* | 6/2011 | Suzuki | H01C 13/02 337/362 |

FOREIGN PATENT DOCUMENTS

| | | |
|---|---|---|
| CN | 1744351 A | 3/2006 |
| CN | 101221868 A | 7/2008 |
| EP | 0590592 A1 | 4/1994 |
| EP | 2133973 A1 | 12/2009 |
| JP | 1998-145964 A | 5/1998 |
| JP | 1999-512598 A | 10/1999 |
| JP | 3247325 | 11/2001 |
| JP | 2006-296180 A | 10/2006 |
| JP | 2007-215399 | 8/2007 |
| JP | 2007-259656 A | 10/2007 |
| WO | WO-2008/114650 A1 | 9/2008 |

OTHER PUBLICATIONS

Office Action and Search Report for Chinese Patent Application No. 201180067098.7, dated Sep. 28, 2014, with translation.
Search Report for Taiwanese Patent Application No. 100146728, completed Aug. 13, 2015.
Extended Search Report dated Oct. 17, 2017 in corresponding EP11848338.7.

* cited by examiner

PROTECTIVE DEVICE

FIELD OF THE INVENTION

The present invention relates to a protection device, specifically a protection device which is disposed in an electrical circuit to prevent an element constructing an electrical apparatus including the circuit from being overheated and/or to prevent an overcurrent from flowing through such circuit, and more specifically relates to a circuit protection device.

BACKGROUND OF THE INVENTION

A bimetal switch wherein a bimetal member and a PTC member are closed to each other and integrally combined is known as a component which opens between contacts being closed in an electrical circuit. In this component, the bimetal member and the PTC member are connected in parallel. Such a bimetal switch is constructed so as to open between contacts by actuating the bimetal member when a temperature of its surrounding environment is abnormally high, while at the same time, a current which flows via the bimetal member is diverted so as to flow via the PTC member.

For example, when a current flowing through a circuit becomes excessively large so that a temperature of an element constructing the circuit becomes abnormally high, such high temperature raises a surrounding temperature of a bimetal switch, thereby the bimetal member acts to open contacts. Even when the contacts are opened as mentioned above, a high potential difference no longer immediately occurs because the current is diverted, and a fusion between the contacts can be prevented as much as possible. The bimetal member of such a bimetal switch is actuated by a high temperature around the bimetal switch as mentioned above.

International Patent Publication WO 2008/114650 is a prior patent reference.

SUMMARY OF THE INVENTION

When the above mentioned bimetal switch is used, it is necessary that its surrounding temperature, in particular a temperature around the bimetal member becomes high. In other words, it is necessary to dispose the bimetal switch at a position where a temperature would exceed a prescribed temperature when an abnormality occurs. The bimetal switch cannot be disposed at a position other than the position as mentioned above.

For example, in the process of charging a secondary battery such as a battery pack, when bringing into an overcharged state, it is necessary to dispose the bimetal switch close to the battery pack enough to be able to detect the high temperature of the battery pack in order to actuate the bimetal member in response to the abnormal high temperature of the battery pack to overcome the overcharged state.

Also, the surrounding temperature of the bimetal switch can often be affected by other factors, as a result of which, it may be possible that the bimetal member is not actuated at a temperature over the prescribed temperature. For example, even in a case wherein a temperature of an element to be protected becomes excessively high, when the heat can immediately dissipate, the surrounding temperature of the bimetal switch does not become high, so that the bimetal member is not actuated.

Furthermore, in the case wherein the above mentioned bimetal switch is used, when a temperature of the bimetal member reaches an abnormal temperature by a heat generated due to a prescribed excess current value, the bimetal switch can only open the circuit to commute the current flowing therethrough. Such excessive current value is inherent to the bimetal member to be used. Therefore, the bimetal member of the bimetal switch cannot be actuated by a current value lower than such inherent value.

Therefore, the object to be solved by the present invention is to provide a protection device which provides a greater degree of freedom in a disposition of the above mentioned bimetal switch as well as be able to more accurately control an actuation of the bimetal member of the bimetal switch.

It is found that the above mentioned object is achieved by applying a constitution in which the above mentioned bimetal switch is used, i.e., the bimetal switch wherein the PTC member and the bimetal member are connected electrically in parallel is used and also the bimetal member is actuated by other PTC member.

That is, in a first aspect, the present invention provides a circuit protection device, in particular a circuit protection device, characterized in that the device comprises a bimetal switch wherein a first PTC member and a bimetal member are connected electrically in parallel with each other; and a second PTC member; and the bimetal member is disposed to be actuated by tripping of the second PTC member.

It is noted that the term "circuit protection device" as used herein is intended to mean that it is able to use to protect a circuit itself in which the circuit protection device is incorporated and/or an electrical element incorporated in the circuit (for example, a secondary battery such as a battery pack).

Each of the PTC members comprised in the circuit protection device of the present invention is a known PTC member, preferably a polymeric PTC member. Such polymeric PTC member comprises a laminar PTC element of an electrically conductive polymer composition comprising a polymer in which an electrically conductive filler is dispersed, and a metal electrode, preferably a metal foil electrode disposed on a surface of each side of the laminar PTC element. An electrically conductive lead may be attached to this metal electrode (for example, by soldering).

The bimetal member comprised in the circuit protection device of the present invention is a known member which is constructed such that its form is transformed into other form at a prescribed temperature, thereby a closed circuit is opened or an opened circuit is closed. Therefore, in one preferable embodiment of the circuit protection device of the present invention, the bimetal switch may be the above mentioned known bimetal switch. In this case, the bimetal member and the first PTC member are closed to each other and are integrated. It is noted that the behavior of the bimetal member wherein the bimetal member opens a circuit to interrupt a current via the bimetal member is referred to as "actuate (actuation)" herein.

In the circuit protection device of the present invention, the bimetal member is disposed to be actuated by tripping of the second PTC member. This means to dispose the bimetal member that it is heated by heat generated in the tripped second PTC member, and as the result of transferring the heat to the bimetal member, a temperature of the bimetal member becomes higher than a temperature at which the bimetal member is actuated, that is, an actuating temperature, thereby the bimetal member is actuated. In order to transfer the heat from the tripped second PTC member to the bimetal member and actuate the bimetal member, it is necessary that the tripping temperature of the second PTC member is the same as or higher than the actuating temperature of the bimetal member. The tripping temperature of the second PTC member is at least 10° C. higher, preferably at least 20° C. higher, more preferably at least 30° C. higher, in particular at least 40° C. higher, for example, 60° C. higher than the actuating temperature of the bimetal member. It is noted that the tripping temperature as used herein means a temperature of a PTC member when the PTC member substantively interrupts a current after the PTC member starts interrupting the current and its resistance is increased.

In the first preferable embodiment of the circuit protection device of the present invention, the bimetal switch has terminals as a first terminal and a second terminal on its two end portions wherein each of the terminals is common to the first PTC member and the bimetal member which are connected in parallel with each other, the second PTC member has terminals as a third terminal and as a fourth terminal on its two end portions, and the bimetal switch and the second PTC member are electrically independent from each other.

With using the circuit protection device of this embodiment, the bimetal switch is connected to a prescribed first electrical element (for example, a battery pack of a secondary battery) and a prescribed second electrical element (for example, a battery charger functioning as an electromotive force source (or an electrical power source) which applies a voltage to the prescribed first electrical element) electrically in series via the first terminal and the second terminal, respectively to construct a main circuit. Additionally, the second PTC member is connected to a switch and an electromotive force source (or an electrical power source) electrically in series via the third terminal and the fourth terminal, respectively in a state of being close to the bimetal member enough to actuate the bimetal member by tripping of the second PTC member to construct a sub-circuit. In this embodiment, the main circuit and the sub-circuit are electrically independent from each other. That is, the main circuit is constructed of the bimetal switch, the first electrical element and the second electrical element, and the sub-circuit is constructed of the second PTC member, the switch and the electromotive force source (or the electrical power source). Those circuits independently form closed circuits. In a more preferable embodiment, a circuit protection device of the present invention as described is inserted into a prescribed casing such that only these four terminals protrude therefrom. When necessary, an opening of the casing which is used for inserting the circuit protection device may be sealed with a suitable adhesive. It is noted that at least one of the prescribed first electrical element and the prescribed second electrical element functions as an electromotive force source.

It is noted that the term "prescribed (first or second) electrical element" means some suitable element (for example, an electrical apparatus, an electrical part, a terminal, a pad, a wiring, or the like) which is used together with the circuit protection device to construct the main circuit, and also has a specified intended electrical function (a battery charging function, an electrical discharging function, or the like), wherein the element is to be protected when an abnormal current flows through the circuit and/or when an abnormal potential difference (or an electrical voltage, hereinafter they are also generally referred to as a "potential difference") occurs in the circuit. In other embodiment, the element may be any combination of these elements. For example, the prescribed first electrical element is a battery pack of a secondary battery which provides an electrical storage function, and the prescribed second electrical element is a battery charger.

The term "main circuit" means a circuit which is constructed such that the circuit functions electrically as intended (for example, a battery charging circuit wherein the prescribed first electrical element is a battery pack of a secondary battery, and the prescribed second electrical element is a battery charger) by incorporating the prescribed first electrical element and the prescribed second electrical element therein. Also the term "sub-circuit" means a circuit which is constructed to be able to pass a current through the second PTC member so as to make it trip, wherein the second PTC member, the switch and the electromotive force source (or the electrical power source) are connected electrically in series.

The switch constructing the above mentioned sub-circuit means a switch which functions to close an opened circuit to pass a current through the second PTC member when a potential difference at a prescribed position of an electrical element to be protected (for example, the prescribed first electrical element) exceeds a prescribed value (for example, when the potential difference of the battery pack of the secondary battery during charging exceeds a certain threshold value). It is noted that when the current flowing through the prescribed first electrical element becomes higher than a prescribed value to be excess, a temperature in the vicinity of the bimetal member becomes high, thereby the bimetal member is actuated so that the current is substantively interrupted as conventional. That is, the overcurrent is diverted to the first PTC member, and then the first PTC member trips, thereby the current is substantively interrupted.

As such a switch, various types of switches are known. Those switches, when the potential difference exceeds the prescribed value as mentioned above (i.e., an abnormal state occurs), can detect it and close the circuit to pass a current through the second PTC member. Such switch is connected in series with a suitable electromotive force source (or an electrical power source) and the second PTC member, and can accurately pass the current depending on the abnormal state. For example, an electromagnetic relay, a FET, and the like can be used as such switch. It is noted that, as mentioned below, FIG. 3 shows schematically a switch 44 which is constructed of an IC detecting a potential difference between both ends of a unit cell 36-1 located on an end portion of a battery pack 36, and a FET which can close the sub-circuit when the detected potential difference is abnormal.

When the sub-circuit is constructed with using the above mentioned circuit protection device in the above mentioned first preferable embodiment, the third terminal may be connected electrically in series with the switch, while the fourth terminal may be connected to the terminal of the prescribed first electrical element electrically in series so as to use a potential difference applied to the prescribed first electrical element or so as to use a potential difference which the prescribed first electrical element itself has. In this case, the sub-circuit is constructed such that the second PTC member, the switch and the prescribed first electrical element or a part thereof are connected electrically in series. Therefore, this sub-circuit shares the first electrical element or a part thereof with the main circuit.

In the second preferable embodiment, the second PTC member in the circuit protection device of the present invention is connected electrically in series with the bimetal switch. In this circuit protection device, it is preferable that the bimetal switch has terminals as a first terminal and a second terminal on its two end portions wherein the terminals are common to the first PTC member and the bimetal member which are connected in parallel, respectively; and one electrode of the second PTC member is connected to one of these terminals, and the other electrode of the second PTC member which electrode is not connected to the terminal of the bimetal switch is connected to a third terminal. In one more preferable embodiment, such circuit protection device of the present invention is inserted into a prescribed casing such that only these three terminals protrude therefrom. When necessary, an opening of the casing which is used for inserting the circuit protection device may be sealed with a suitable adhesive. It is noted that this embodiment corresponds to the above mentioned first preferable embodiment wherein the fourth terminal is connected between the terminal of the bimetal switch and the first terminal within the circuit protection device.

In one specific embodiment, the first terminal is connected to one terminal of the prescribed first electrical element such that the bimetal switch is connected in series with the prescribed first electrical element, while the third terminal is connected to the other terminal of the prescribed first electrical element via the switch electrically in series. In this embodiment, at least a part of the prescribed first electrical element is shared by the main circuit and the sub-circuit share.

As easily understood, the present invention further provides an electrical circuit comprising the circuit protection device of the present invention as mentioned above, and such electrical circuit comprises the main circuit and the sub-circuit. In addition, the present invention provides an electrical apparatus comprising such electrical circuit.

In an electrical circuit in which the circuit protection device of the present invention is incorporated, when a potential difference at a prescribed position in a prescribed electrical element to be protected exceeds a prescribed value, that is, an abnormal state occurs, the switch detecting it closes the sub-circuit to pass a current through the second PTC member, so that the second PTC member trips, and thereby the bimetal member is actuated.

In other words, by using the switch constructed to determine that the abnormal state occurs when detecting the prescribed potential difference so as to close the circuit, the second PTC member is made surely trip, so that the bimetal member is actuated. Therefore, by selecting a switch which closes a circuit when a prescribed potential difference occurs, the second PTC member is made trip to actuate the bimetal member independently from a current flowing through the main circuit. That is, the bimetal member is actuated by the second PTC member, and thereby the current flowing through the circuit protection device can be interrupted.

In the conventional circuit protection device, it was necessary that the circuit protection device is disposed close to a position where an abnormal high temperature state may arise. However, when the circuit protection device of the present invention is used, it is sufficient that the switch detects a potential difference at a prescribed position and passes a current through the second PTC member. Therefore, the bimetal member, and therefore, the circuit protection device comprising the bimetal member can be disposed away enough from the electrical element to be protected not to be thermally affected. Thus, a degree of freedom as to the position where the circuit protection device is incorporated is greatly increased.

A function of the circuit protection device to start interrupting a current flowing through the main circuit at the time of an abnormally high temperature state is triggered by a function of the switch to detect an abnormal potential difference. Therefore, even when a small current which cannot trip the first PTC member flows through the main circuit, the second PTC member trips to actuate the bimetal member, for example, if only the switch detects an abnormality of a potential difference at a desired position in the first electrical element. Therefore, by using a switch which can detect a potential difference at a high sensitivity, the circuit protection device of the present invention can be used at a high accuracy.

THE INVENTION

Figure 1:
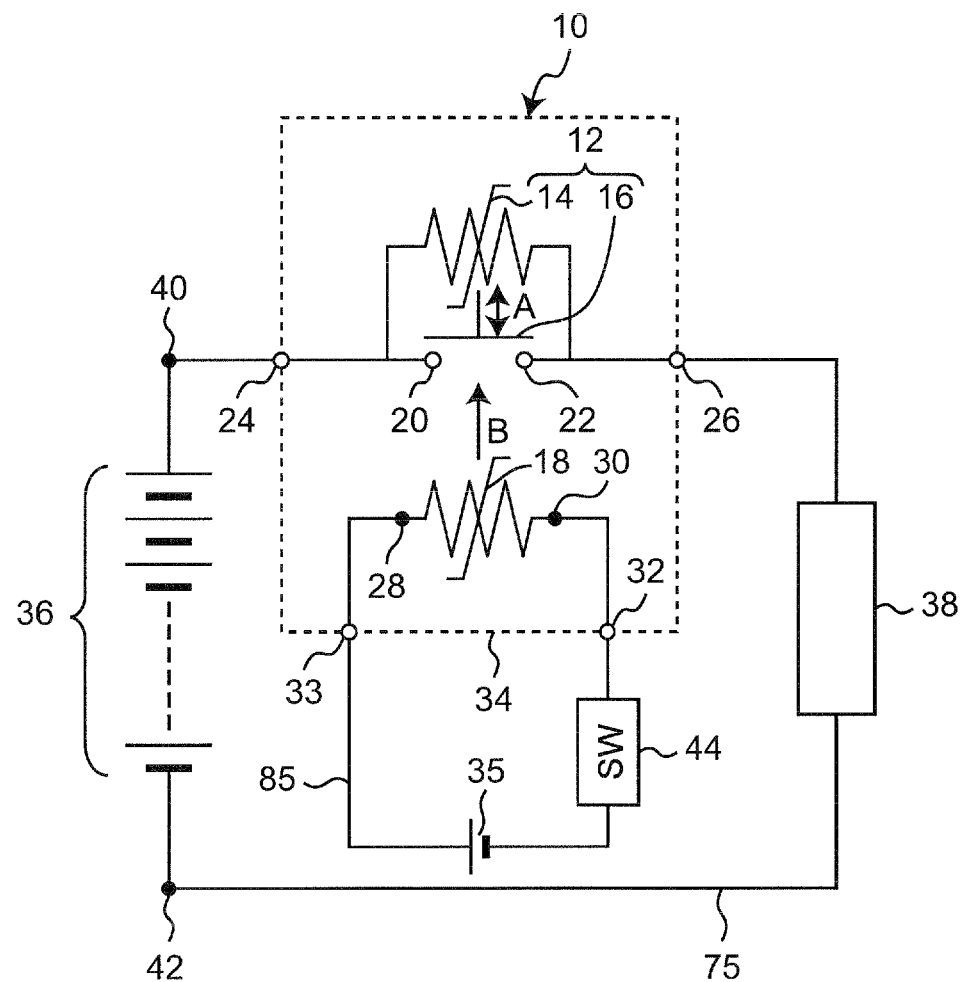
FIG. 1 shows schematically in a circuit diagram a circuit protection device of the present invention and a charging circuit of a secondary battery which comprises the device.

Next, the circuit protection device of the present invention is described in more detail below with reference to the drawings. As illustrated in FIG. 1, the circuit protection device 10 of the present invention (the portion surrounded with the dotted line) comprises a bimetal switch 12. The bimetal switch 12 comprises a first PTC member 14 and a bimetal member 16 which are connected electrically in parallel with each other. In the illustrated embodiment, the bimetal switch in the circuit protection device of the present invention has terminals as a first terminal 24 and a second terminal 26 at both end portions of the bimetal switch wherein the terminals are common to the first PTC member 14 and the bimetal member 16 which are connected in parallel with each other. The second PTC member has a third terminal 32 which is connected to one metal electrode 30 of the PTC member and a fourth terminal 33 which is connected to the other metal electrode 28 on the two end portions of the second PTC member. The bimetal switch 12 and the second PTC member 18 are electrically independent from each other.

When a protection circuit is formed by using the circuit protection device of this embodiment, the bimetal switch is electrically connected to a prescribed first electrical element 36 (for example, a battery pack of a secondary battery) and a prescribed second electrical element 38 (for example, a battery charger functioning as an electromotive force source (or an electrical power source) which applies a voltage to the prescribed first electrical element) via the first terminal 24 and the second terminal 26, respectively to construct a main circuit 75. Additionally, the second PTC member 18 is connected to a switch 44 (SW) and an electromotive force source (or an electrical power source) 35 electrically in series via the third terminal 32 and the fourth terminal 33, respectively in a state of being close to the bimetal member 16 enough to actuate the bimetal member 16 by tripping of the second PTC member, and thereby a sub-circuit 85 is formed.

In this embodiment, the main circuit 75 and the sub-circuit 85 are electrically independent from each other. That is, the main circuit 75 is constructed of the bimetal switch 12, the first electrical element 36 and the second electrical element 38, and the sub-circuit 85 is constructed of the second PTC member 18, the switch 44 and the electromotive force source (or the electrical power source) 35. Those circuits independently form closed circuits, respectively. In one more preferable embodiment, such circuit protection device of the present invention is inserted into a prescribed casing 34 such that only these four terminals 24, 26, 32 and 33 protrude from the casing. When necessary, an opening of the casing which is used for inserting the circuit protection device may be sealed with a suitable adhesive.

It is noted that the bimetal member 16 is facing the contacts 20 and 22 being separated from each other, and the bimetal member deforms to connect these contacts 20 and 22 (that is, to close the circuit) or to separate from the contacting state to open the circuit (that is, the bimetal member and the contacts are separated from the contacting state) as shown by a double-headed arrow "A". It is noted that the function of the bimetal member to open the circuit from the contacting state is referred to as an "actuation" herein. In the state shown in FIG. 1, the bimetal member 16 is a separate state from the contacts 20 and 22, as a result of which, the circuit connecting between these contacts is in an open state, that is, an actuating state.

In the circuit protection device of the present invention, the bimetal member 16 is disposed to be actuated by tripping of the second PTC member 18. This means to dispose such that, a heat generated from the tripped second PTC member in a high-temperature state is transferred to the bimetal member as shown by an arrow "B", and thereby the bimetal member is heated, as a result of which the temperature of the bimetal member exceeds a temperature over a temperature at which the bimetal member is actuated (i.e., an actuating temperature), and thereby the bimetal member is actuated. Preferably, the bimetal member and the second PTC member are thermally in a contacting state directly or an adjacent state indirectly. However, as long as the bimetal member is actuated as mentioned above, there may be a space between the bimetal member and the second PTC member.

In order to transfer the heat from the tripped second PTC member 18 to the bimetal member 16, that is, to exert a thermal effect, the tripping temperature of the second PTC member is characterized to be the same as or higher than the actuating temperature of the bimetal member. The tripping temperature of the second PTC member is at least 10° C. higher, preferably at least at least 20° C. higher, more preferably at least 30° C. higher than the actuating temperature of the bimetal member. In order to actuate the bimetal member 16 as mentioned above, it is necessary that the bimetal member 16 and the second PTC member 18 are closed to each other so that the second PTC member 18 can thermally affect the bimetal member 16, preferably they are directly contacted with each other. In other embodiment, they may be indirectly contacted via a material having high thermal conductivity, for example, a metal material.

With the above mentioned circuit protection device 10 of the present invention, the bimetal switch 12 can be incorporated in a prescribed electrical circuit comprising the prescribed first electrical element 36 to form the main circuit 75. The state in which the bimetal switch is incorporated as mentioned above is also shown in FIG. 1. A battery pack of a secondary battery having a structure in which a plurality of unit cells are connected in series is illustrated in FIG. 1 as the prescribed first electrical element 36. The main circuit 75 functions as a charging circuit which charges the battery pack 36, and comprises a battery charger 38 (corresponding to the prescribed second electrical element) to form the charging circuit. This also functions as an electromotive force source (or an electrical power source) for driving the prescribed first electrical element.

In particular, in the illustrated embodiment, the first terminal 24 is connected to one terminal 40 of the prescribed electrical element such that the bimetal switch 12 is connected in series with the prescribed first electrical element 36, and the prescribed second electrical element 38 is connected to the other terminal 42 of the prescribed first electrical element 36. Additionally, the third terminal 32 of the second PTC member is connected to the switch (SW) 44, and the fourth terminal 33 is connected to the electromotive force source (or the electrical power source) 35, so that they form the sub-circuit 85. This switch 44 detects a potential difference at a prescribed position of the prescribed first electrical element 36 (for example, an unit cell between one terminal 40 and the other terminal 42 of the battery pack) or a potential difference between the terminals 40 and 42, and the switch 44 functions to close between the contacts of the switch 44 and pass a current through the second PTC member 18 when the potential difference becomes higher than a prescribed value (for example, when the potential difference of the battery pack of the secondary battery during charging exceeds a certain threshold value). Therefore, there is a potential difference detecting means for detecting the potential difference at the prescribed position and communicating the information (for example, an IC) and wirings (not illustrated) between the prescribed position and the switch 44.

The state shown in FIG. 1 shows a state, for example, just after, the switch 44 detects an excessive potential difference of the prescribed element 36 and then closes the circuit 85 so as to pass a current into the second PTC member 18, whereby the second PTC member 18 trips, so that the generated heat by means of tripping is transferred to the bimetal member 16, as a result of which the bimetal member 16 is actuated. In this case, at the moment when the bimetal member 16 is actuated, the current flowing between the contacts 20 and 22 in the bimetal switch 12 is diverted to the first PTC member 14. Thereafter, the first PTC member 14 trips, and as the result, the current flowing through the first PTC member 14 is substantively interrupted, so that it is avoided that the current flows through the main circuit. The second PTC member 18 is kept in the voltage applied state by the electromotive force source (or the electrical power source) 35, and thus, it is kept tripping. Therefore, the bimetal member 16 is kept being actuated, and the contacts 20 and 22 are kept opening.

Figure 2:
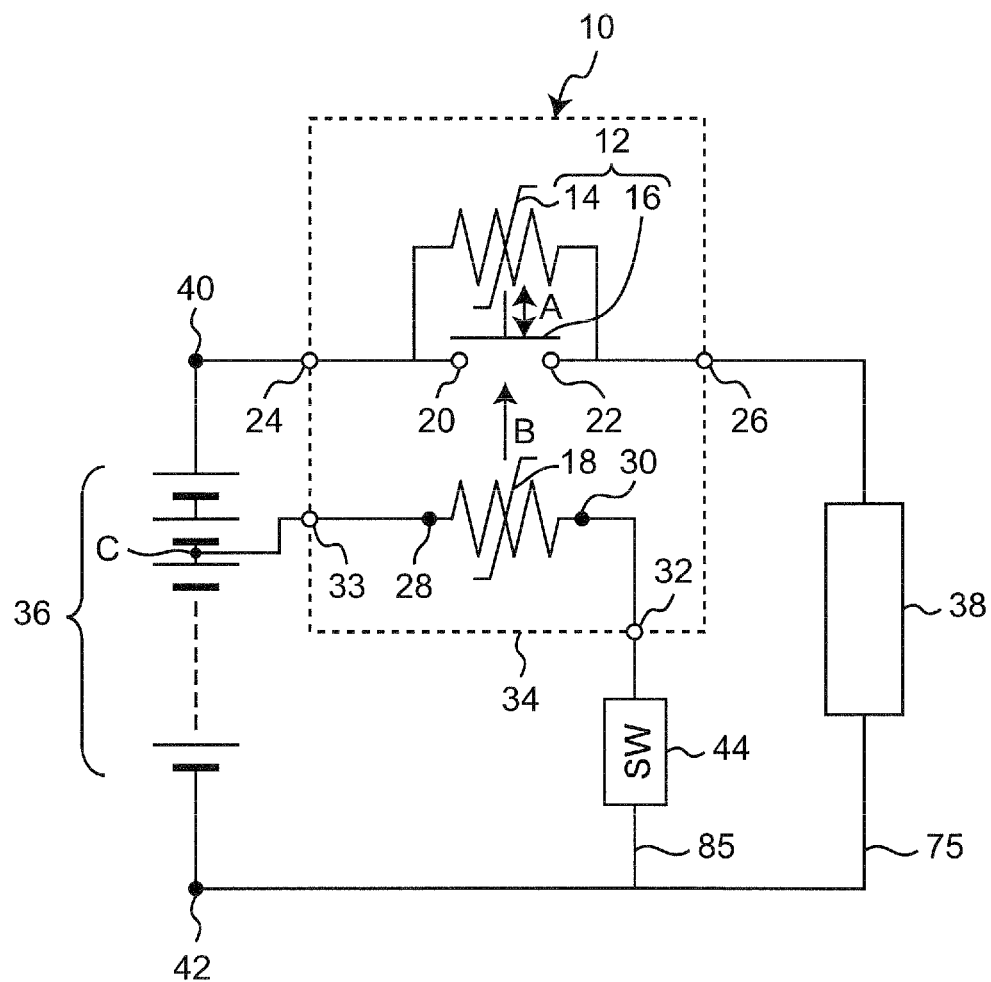
FIG. 2 shows schematically in a circuit diagram a circuit protection device of the present invention of another embodiment and a charging circuit of a secondary battery which comprises the device.

The circuit protection device 10 of other embodiment of the present invention is shown in FIG. 2 (the portion surrounded with the dotted line). In this embodiment, the circuit protection device 10 comprises the bimetal switch 12, and the bimetal switch 12 comprises the first PTC member 14 and the bimetal member 16 which are connected electrically in parallel. In the illustrated embodiment, the bimetal switch in the circuit protection device of the present invention has terminals as the first terminal 24 and the second terminal 26 at both end portions of the bimetal switch wherein the terminals are common to the first PTC member 14 and the bimetal member 16 which are connected in parallel with each other, and the second PTC member 18 has the third terminal 32 which is connected to one metal electrode 30 of the PTC member 18 and the fourth terminal 33 which is connected to the other metal electrode 28 of the PTC member 18 at both end portions of the second PTC member.

In the embodiment shown in FIG. 2, it is different from the embodiment shown in FIG. 1 in that the embodiment shown in FIG. 2 is constructed such that the fourth terminal 33 is connected to a position (a point "C") between the terminal 40 and the terminal 42 of the prescribed first electrical element 36 so as to use a part of the prescribed first electrical element, in particular, so as to use a part of a voltage which is applied to the prescribed first electrical element as an electromotive force source (or an electrical power source), and the others are substantively the same as those in the embodiment shown in FIG. 1. As the result, in the illustrated embodiment, the sub-circuit 85 is constructed by connecting the second PTC member 18, a part of the first electrical element 36, and the switch 44 in series. Therefore, the main circuit 75 and the sub-circuit 85 share a part of the first electrical element 36 and a part from such part up to just before the switch 44.

Figure 3:
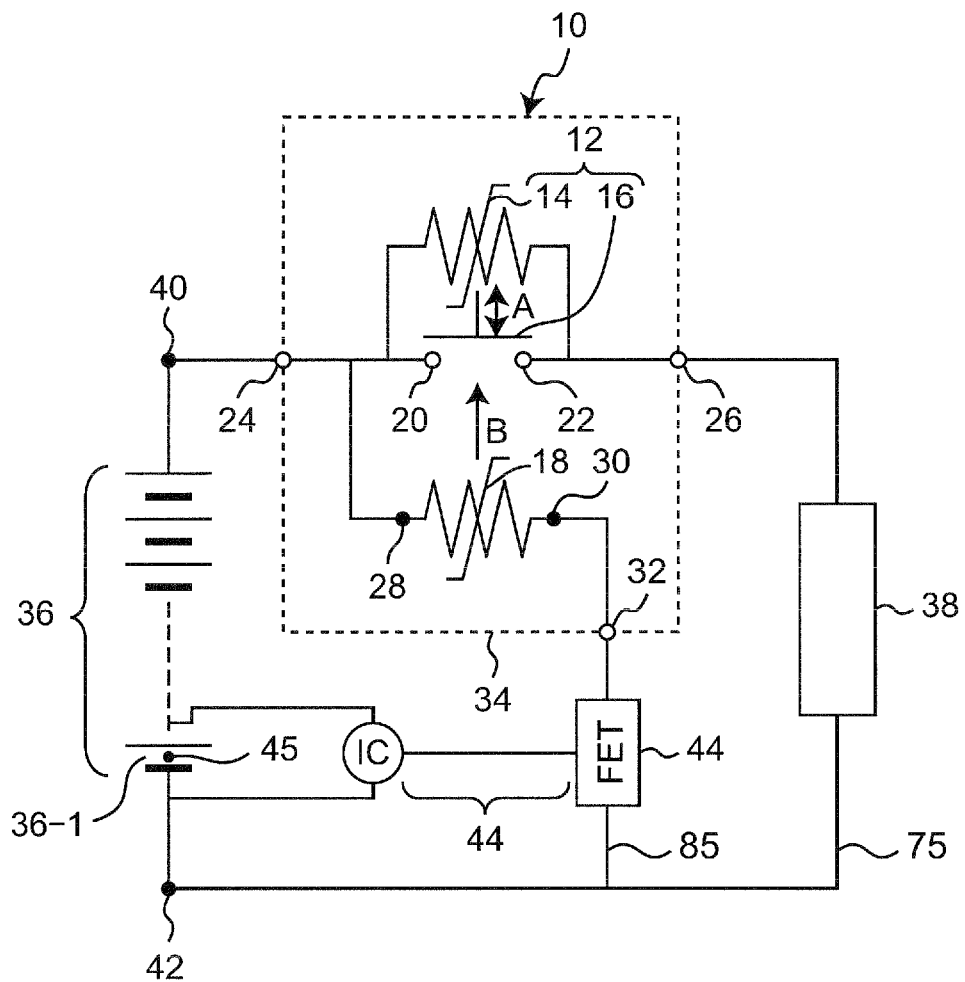
FIG. 3 shows schematically in a circuit diagram a circuit protection device of the present invention of a further embodiment and a charging circuit of a secondary battery which comprises the device.

The circuit protection device 10 of a further embodiment of the present invention is shown in FIG. 3 (the portion surrounded with the dotted line). In this embodiment, the bimetal switch 12 has terminals as the first terminal 24 and the second terminal 26 at both end portions of the bimetal switch wherein the terminals are common in the first PTC member 14 and the bimetal member 16 respectively which are connected in parallel with each other, and one metal electrode 28 of the second PTC member 18 is substantively connected to one of these terminals (the first terminal 24 in the illustrated embodiment), as a result of which the bimetal switch 12 and the second PTC member 18 are connected in series. The other metal electrode 30 of the second PTC member 18 is connected to the third terminal 32. Therefore, in this further embodiment, the main circuit 75 and the sub-circuit 85 share the whole of the first electrical element 36 and a part from the element 36 up to just before the switch (FET) 44. In one preferable embodiment, such circuit protection device of the present invention is inserted into a prescribed casing such that only three terminals 24, 26 and 32 protrude therefrom. Similar to the above, in the embodiment shown in FIG. 3, the dotted line can be understood to correspond to the casing 34. An opening of the casing which is used for inserting the circuit protection device may be sealed with a suitable adhesive.

The circuit protection device 10 of the present invention as described above can be incorporated in a prescribed electric circuit of the present invention in which a prescribed electrical element is incorporated. This state in which device is incorporated as mentioned above is shown in FIG. 3. In FIG. 3, a battery pack of a secondary battery is illustrated as the prescribed first electrical element 36, and a charging circuit for charging this battery pack of the secondary battery is illustrated as the prescribed electric circuit (corresponding to the main circuit). In order to construct such electric circuit, a battery charger 38 is also illustrated. This battery charger functions as an electromotive force source (or an electrical power source) as the prescribed second electrical element for driving the prescribed first electrical element. As understood from FIG. 3, the bimetal switch 12 is connected electrically in series with the prescribed first electrical element 36, and the second PTC member 18 and the prescribed first electrical element 36 are connected in parallel with the second electrical element.

In particular, in the illustrated embodiment, the first terminal 24 is connected to one terminal 40 of the prescribed electrical element, and the third terminal 32 is connected to the other terminal 42 of the prescribed electrical element 36 via the switch (FET) 44 such that the bimetal switch 12 is connected in series with the prescribed first electrical element 36. For example, this switch 44 acts to close between contacts in the switch (FET) 44 and pass the current into the second PTC member 18 when the potential difference in a prescribed position 45 in the prescribed first electrical element 36 (strictly, in the illustrated embodiment, a potential difference across the endmost unit cell 36-1 among unit cells constructing of the battery pack 36) becomes higher than a prescribed value as illustrated (for example, when a potential difference of a battery pack of a secondary battery during charging exceeds a certain threshold value). The illustrated embodiment is constructed so as to use the voltage which is applied to the prescribed first electrical element 36 also as a current source for tripping the second PTC member 18.

The state shown in FIG. 3 is a state just after, the switch 44 detects that the potential difference at the prescribed position 45 is excess and then closes the sub-circuit 85, whereby the second PTC member 18 trips, and the generated heat is transferred to the bimetal member 16, as a result of which the bimetal member 16 is actuated. In this case, at the moment when the bimetal member 16 is actuated, the current flowing between the contacts 20 and 22 of the bimetal switch 12 is diverted to the first PTC member 14. Then, the first PTC member 14 trips, as a result of which the current flowing through the first PTC member 14 is substantively interrupted, whereby it is avoided that the current flows through the charging circuit. Since to the second PTC member 18 is applied the same voltage as that in the electrical element 36, the second PTC member is kept in a tripping state, so that the bimetal member 16 is kept being actuated, and the contacts 20 and 22 are being kept opened.

It is noted that when "(be) connected electrically in parallel or in series" is referred to herein, the elements may be directly connected or the elements may be indirectly connected via other element which is present between the elements connected. For example, a standard resistor may be present between the elements which are connected.

Figure 4:
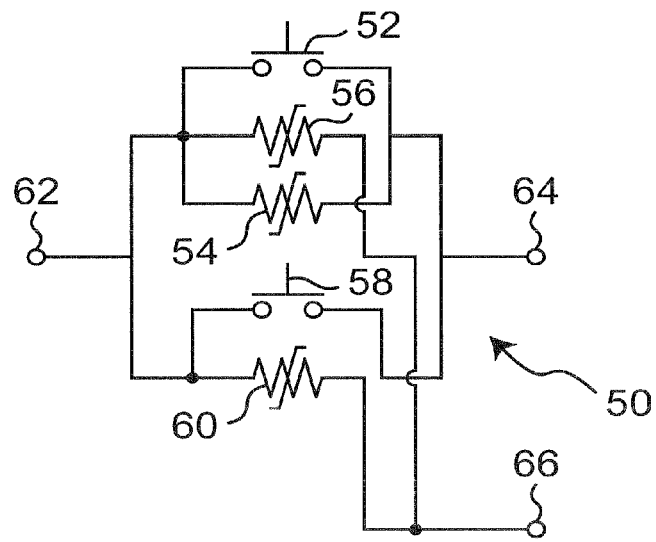
FIG. 4 shows schematically in a circuit diagram a circuit protection device of the present invention of another embodiment.

Other embodiment of the circuit protection device of the present invention is schematically shown in a circuit diagram in FIG. 4. This circuit protection device 50 comprises a bimetal switch comprising a bimetal member 52 and a first PTC member 54 which are connected in parallel as well as a second PTC member 56 which is connected in series with the bimetal switch. This circuit protection device 50 further comprises another bimetal switch which comprises another bimetal member 58 and another second PTC member 60 which is connected in series with the bimetal member 58. The latter bimetal member 58 is connected in parallel with the first PTC member 54. As a result, two bimetal members 52 and 58 share one first PTC member 54 which is connected in parallel. That is, the illustrated circuit protection device 50 has two bimetal switches which are connected in parallel and only one first PTC member.

In the illustrated embodiment, one end of each of two bimetal switches is connected to the first terminal 62, the other end thereof is connected to the second terminal 64, one electrode of each of the second PTC members 56 and 60 is connected to one terminal of the bimetal switch, and the other electrode thereof is connected to the third terminal 66. When the bimetal switches are connected in parallel as described above, there is an advantage that an amount of a current flowing can be increased between the first terminal 62 and the second terminal 64, and thus, an amount of a current flowing through the prescribed circuit. That is, an ampacity of the circuit protection device can be increased. In this case, when the bimetal members 52 and 58 are actuated, the current flowing therethrough can be diverted to the first PTC member 54. It is noted that preferably, the circuit protection device is constructed such that the bimetal members 52 and 58 are actuated substantively at the same time.

As mentioned above, by connecting a plurality of the bimetal switches in parallel, the ampacity of the circuit protection device can be increased. As understood easily, the number of the first PTC devices to which a current flowing between the contacts of the bimetal member should be diverted may be one or the same as the number of the bimetal members, or the number therebetween depending on an amount of current to be diverted. In the embodiment shown in FIG. 4, though the second PTC members are disposed corresponding to the bimetal members, one second PTC member may be disposed to actuate two bimetal members. For example, two bimetal members are disposed close to one second PTC member.

Figure 5:
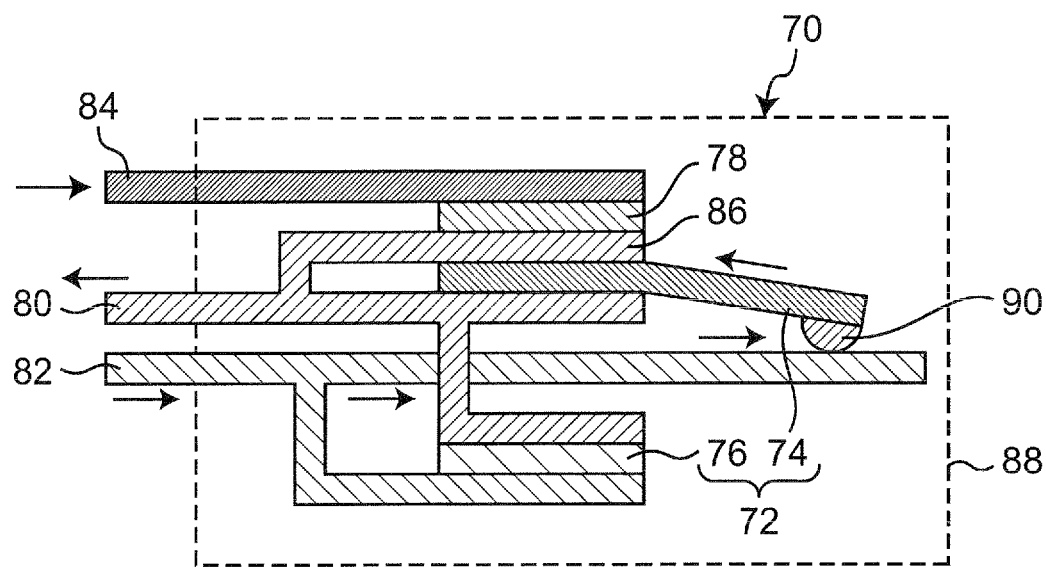
FIG. 5 schematically shows a cross-sectional view of a circuit protection device of the present invention (in a state in which a bimetal member connects contacts, that is, a circuit closing state)

One embodiment of the circuit protection device of the present invention is schematically shown in a cross-section view in FIG. 5. It is noted that this embodiment corresponds to the device shown in FIG. 3. The illustrated circuit protection device 70 comprises a bimetal switch 72 which is constructed of a bimetal member 74 and a first PTC member 76. The circuit protection device further comprises a second PTC member 78, and includes a first terminal 80, a second terminal 82 and a third terminal 84.

This circuit protection device is disposed in a prescribed electric circuit and is connected such that when the circuit normally functions, a current is inputted from the second terminal 82 and is outputted from the first terminal 80 via the bimetal member 74 as shown by arrows. In the state shown in FIG. 5, the circuit normally functions.

When an abnormality arises in the prescribed electrical element disposed in the electrical circuit, a switch (not illustrated) detecting the abnormality passes a current into the second PTC member 78 via the third terminal 84 as shown by an arrow (an upper arrow in FIG. 5), and thereby the second PTC member 78 trips. In the illustrated embodiment, the second PTC member 78 is disposed adjacent to the bimetal member 74. However, it is noted that a lead section is present between them. That is, the bimetal member 74 is indirectly contacted with the second PTC member 78 via the lead section 86. The lead section and the terminals are made of an electrically conductive metal material which has a good thermal conductivity.

Figure 6:
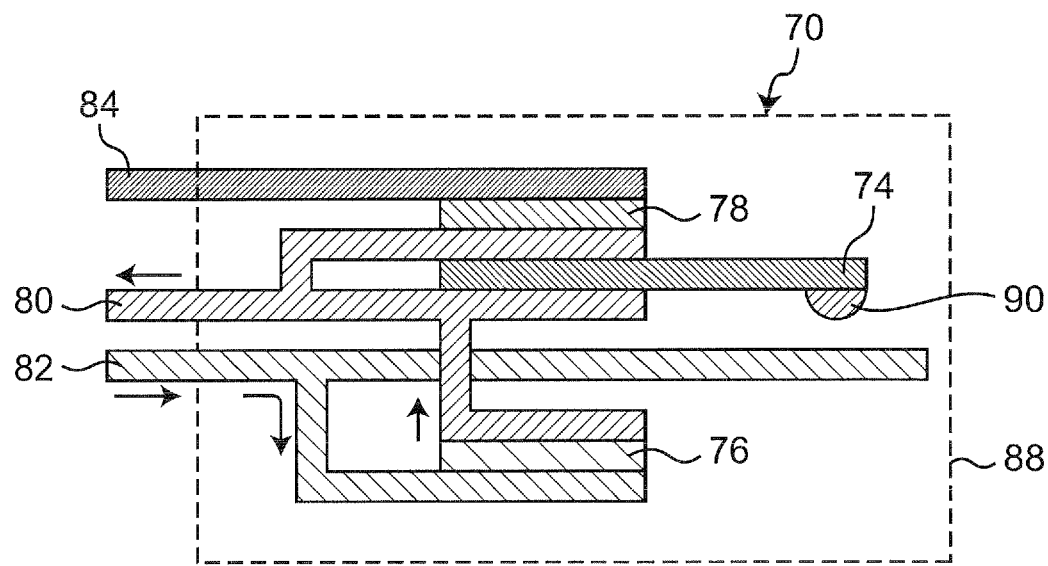
FIG. 6 schematically shows a cross-section view of a circuit protection device of the present invention (in a state in which a bimetal member is separate from a contact, that is, a circuit opening state)

As the result, the tripped second PTC member 78 becomes a high temperature, and by this heat, the bimetal member 74 is deformed, actuated, and opens the circuit. Such state in which the circuit is opening is shown schematically in FIG. 6. At the moment the circuit opens, the current flowing through the bimetal member 74 is diverted to flow via the first PTC member 76 as shown by arrows.

In the illustrated embodiment, the bimetal member 74, the first PTC member 76 and the second PTC member 78 are connected by the electrically conductive material which functions as leads, and the end portions of the lead constructs the terminals. Additionally, a dotted line 88 in FIG. 5 and FIG. 6 corresponds to a casing of the circuit protection device which houses the bimetal switch and the second PTC member. It is noted that the bimetal member has the contact 90 on its apical end portion.

Example 1

The circuit protection devices 10 shown in FIG. 3 were produced by using the following commercially available bimetal member and PTC member:

Bimetal member: Snap Action type (made of a clad sheet of a Cu—Ni—Mn alloy and a Ni—Fe alloy; Actuating temperature: 100° C.)

First PTC member: Polyethylene based PTC member (manufactured by Tyco Electronics Japan; Tripping temperature: 120° C.)

Second PTC member: PVDF based PTC member (manufactured by Tyco Electronics Japan; Tripping temperature: 160° C.)

The above mentioned components were connected as shown in FIG. 3. Then, they were disposed within a resin casing such that only the first terminal, the second terminal and the third terminal protrude from and end surface of the casing to produce the circuit protection device 10 shown in FIG. 1.

Figure 7:
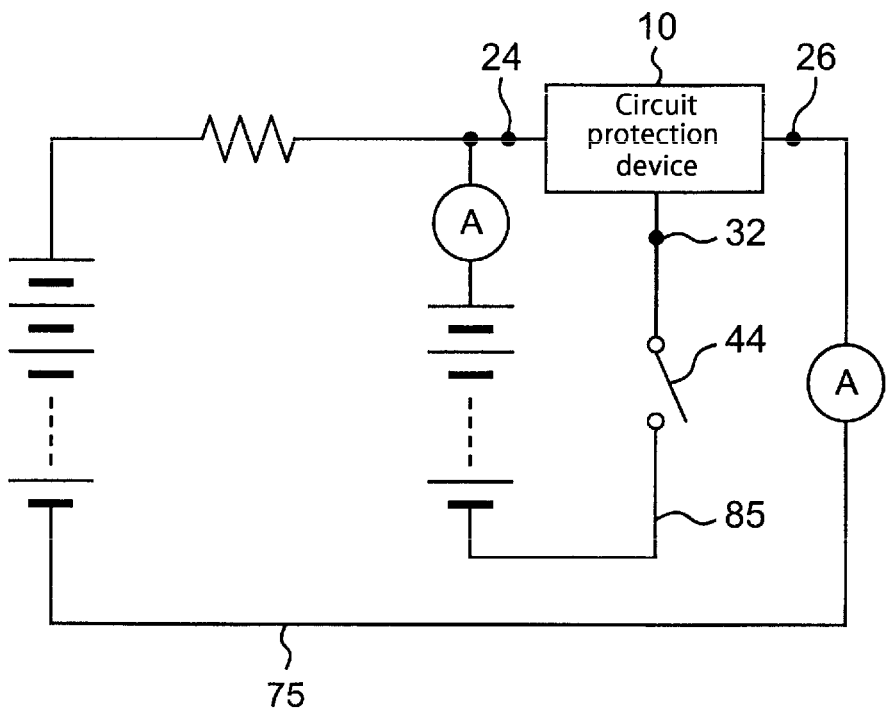
FIG. 7 schematically shows a circuit diagram of a circuit used in the examination of a circuit protection device of the present invention produced in the Examples.

The circuit protection device thus obtained was incorporated in a test circuit shown in FIG. 7, and 1.0-60 A of current was passed between the first terminal 24 and the second terminal 26 for 180 seconds as a current for the main circuit 75. Then, the switch 44 was closed by passing 100 A of current through the second PTC member as a current of the sub-circuit 85, whereby the second PTC member tripped. It is noted that the test was performed at the temperature of a room temperature (25° C.), 0° C. and −40° C. under the test environment.

Figure 8:
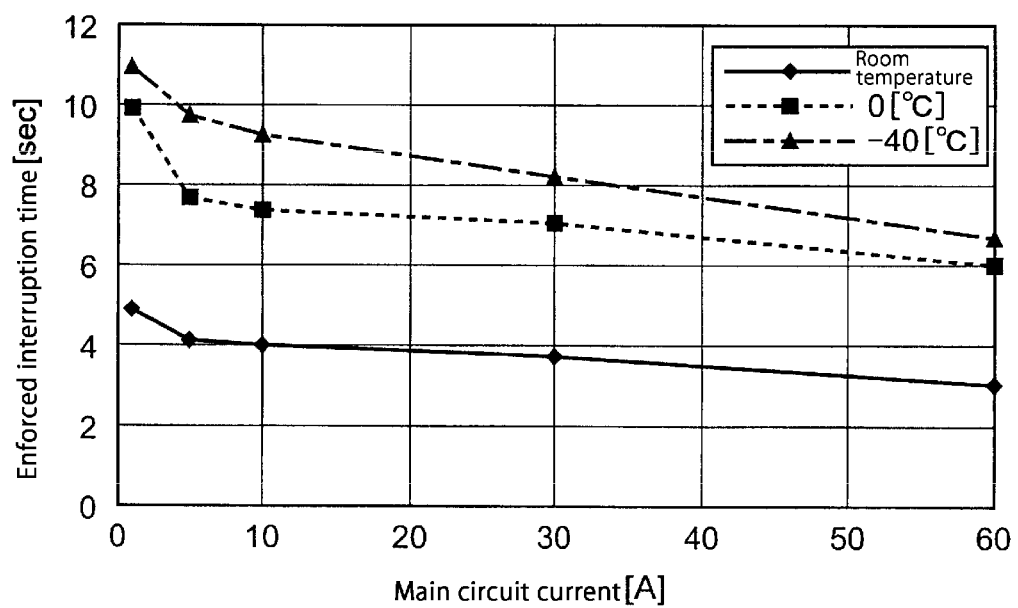
FIG. 8 shows results of a measurement of time up to tripping of the first PTC member by means of the second PTC member using a circuit protection device of the present invention produced in the Examples.

A time point of closing the switch 44 was made to be zero, the time until the current which flows between the first terminal 24 and the second terminal 26 is substantively interrupted (i.e., an enforced interrupting time), that is, the time until the first PTC member trips was measured. The measurement results are showed in FIG. 8.

From this result, the smaller the current of the main circuit is and the lower the environment temperature is, the longer the interrupting time. For example, it is said that a target interrupting time is 20 or less seconds for the protection from overcharge, and therefore, the circuit protection device of the present invention sufficiently achieves the target time even under the low temperature environment.

The element reference numbers are:
10—circuit protection device,
12—bimetal switch,
14—first PTC member,
16—bimetal member,
18—second PTC member,
20, 22—contact,
24—first terminal,
26—second terminal, 28, 30—electrode,
32—third terminal,
33—fourth terminal,
35—electromotive force source (or electrical power source),
36—first electrical element,
38—second electrical element,
40, 42—terminal,
44—switch,
50—circuit protection device,
52—bimetal member,
54—first PTC member,
56—second PTC member,
58—bimetal member,
60—second PTC member,
62—first terminal,
64—second terminal,
66—third terminal,
70—circuit protection device,
74—bimetal member,
75—main circuit,
76—first PTC member,
78—second PTC member,
80—first terminal,
82—second terminal,
84—third terminal,
85—sub-circuit,
88—casing,
90—contact

What is claimed is:

1. An electrical circuit comprising:
a prescribed electrical element to be protected;
a first electromotive force source for providing electrical power to the prescribed electrical element;
a circuit protection device connected electrically in series intermediate the the prescribed electrical element and the first electromotive force source for protecting the prescribed electrical element, the circuit protection device comprising:
a bimetal switch including a first PTC member and a bimetal member connected electrically in a parallel with each other; and
a second PTC member disposed adjacent the bimetal switch;
the electrical circuit further comprising a switch and a second electromotive force source connected electrically in series with the second PTC member, wherein the switch is configured to detect a potential difference in the prescribed first electrical element and to switch to a closed position when the potential difference exceeds a predefined threshold, thereby supplying current from the second electromotive force source to the second PTC member to cause tripping of the second PTC member;
the bimetal member being disposed to be actuated by tripping of the second PTC member;
wherein the second electromotive force source is electrically independent of the first electromotive force source.

2. An electrical apparatus which comprises the electrical circuit according to claim 1.

3. The circuit protection device according to claim 1 characterized in that a tripping temperature of the second PTC member is at least 10° C. higher than an actuating temperature of the bimetal member.

4. The electrical circuit according to claim 1 wherein the bimetal switch has terminals as a first terminal and a second terminal on its two end portions wherein each of the terminals is common to the first PTC member and the bimetal member which are connected in parallel with each other; the second PTC member has a third terminal and a fourth terminal on its two end portions; and the bimetal switch and the second PTC member are electrically independent from each other.

5. The electrical circuit according to claim 4 wherein the first terminal and the second terminal are able to connect the bimetal switch to the prescribed first electrical element and the first electromotive force source electrically in series, respectively to construct a main circuit; the third terminal and the fourth terminal are able to be connected to the switch and to the second electromotive force source electrically in series, respectively to construct a sub-circuit; the sub-circuit thus connected is electrically independent.

* * * * *